(12) United States Patent
Garman et al.

(10) Patent No.: US 10,857,528 B2
(45) Date of Patent: Dec. 8, 2020

(54) POROUS DECONTAMINATION REMOVAL COMPOSITION

(71) Applicant: UWM Research Foundation, Inc., Milwaukee, WI (US)

(72) Inventors: David Edward John Garman, Milwaukee, WI (US); Marcia Renata Quadros Da Silva, Oak Creek, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 33 days.

(21) Appl. No.: 16/307,400

(22) PCT Filed: Jun. 9, 2017

(86) PCT No.: PCT/US2017/036793
§ 371 (c)(1),
(2) Date: Dec. 5, 2018

(87) PCT Pub. No.: WO2017/214530
PCT Pub. Date: Dec. 14, 2017

(65) Prior Publication Data
US 2020/0001283 A1    Jan. 2, 2020

Related U.S. Application Data

(60) Provisional application No. 62/348,032, filed on Jun. 9, 2016.

(51) Int. Cl.
*B01J 29/06* (2006.01)
*B01J 29/90* (2006.01)
(Continued)

(52) U.S. Cl.
CPC ......... *B01J 29/061* (2013.01); *B01J 29/7049* (2013.01); *B01J 29/90* (2013.01);
(Continued)

(58) Field of Classification Search
CPC ........ B01J 29/061; B01J 37/009; B01J 38/02; B01J 29/90; B01J 2229/42; B01J 37/088; B01J 38/48; B01J 29/064; B01J 29/068; B01J 38/00; B01J 29/085; B01J 29/185; B01J 29/405; B01J 29/505; B01J 29/605; B01J 29/655; B01J 29/7049;
(Continued)

(56) References Cited

U.S. PATENT DOCUMENTS 4,231,899 A * 11/1980 Chen .................. B01J 29/40
502/62
5,573,990 A    11/1996 Wang et al.
(Continued)

OTHER PUBLICATIONS

Othman, et al., "Synthesis and modification of ZSM-5 with manganese and lanthanum and their effects on decolorization of indigo carmine dye," Applied Catalysis A: General, 2006, 299:95-102.
(Continued)

*Primary Examiner* — Joseph W Drodge
(74) *Attorney, Agent, or Firm* — Michael Best & Friedrich LLP

(57) ABSTRACT

The present disclosure provides enhanced zeolites and methods of making and using same.

7 Claims, 11 Drawing Sheets

(51) Int. Cl.
*B01J 37/00* (2006.01)
*B01J 38/02* (2006.01)
*B01J 29/70* (2006.01)
*C02F 1/28* (2006.01)
*C02F 101/10* (2006.01)

(52) U.S. Cl.
CPC ............. *B01J 37/009* (2013.01); *B01J 38/02* (2013.01); *C02F 1/281* (2013.01); *B01J 2229/24* (2013.01); *B01J 2229/42* (2013.01); *C02F 2101/105* (2013.01)

(58) Field of Classification Search
CPC . B01J 2229/24; C02F 1/281; C02F 2101/105; C02F 1/28; C02F 1/288; C02F 1/58; C02F 1/66
USPC ........ 210/660, 679, 670; 502/20, 22, 24, 65, 502/66, 73, 74, 406
See application file for complete search history.

(56) References Cited

U.S. PATENT DOCUMENTS

| | | | |
|---|---|---|---|
| 5,919,721 | A | 7/1999 | Potter |
| 8,119,075 | B2 | 2/2012 | Dettling et al. |
| 2003/0083193 | A1* | 5/2003 | Takaya ................. B01D 53/945 502/304 |
| 2004/0129135 | A1* | 7/2004 | Roark ..................... C04B 35/42 95/55 |
| 2007/0104623 | A1 | 5/2007 | Dettling et al. |
| 2009/0111689 | A1* | 4/2009 | Burba, III ............ B01J 20/2803 502/402 |
| 2011/0000894 | A1* | 1/2011 | Ishida ................. H01J 7/32724 219/121.43 |
| 2012/0015801 | A1 | 1/2012 | Deprez et al. |
| 2012/0058034 | A1* | 3/2012 | Ogunwumi .......... B01J 37/0009 423/239.2 |
| 2012/0261611 | A1* | 10/2012 | Hassler ................. C02F 1/5236 252/182.3 |
| 2014/0303266 | A1 | 10/2014 | Hyman |
| 2015/0259264 | A1 | 9/2015 | Nesterenko et al. |
| 2016/0096747 | A1* | 4/2016 | Richardson ............. C02F 1/288 210/662 |
| 2017/0128913 | A1* | 5/2017 | Goffe ................. B01D 53/9418 |
| 2017/0348679 | A1* | 12/2017 | Naraki ................. B01J 37/0018 |

OTHER PUBLICATIONS

Sugi, et al., "Shape-selective alkylation and related reactions of mononuclear aromatic hydrocarbons over H-ZSM-5 zeolites modified with lanthanum and cerium oxides," Applied Catalysis A: General, 2006, 299:157-166.

Yang, et al., "A designed nanoporous material for phosphate removal with high efficiency," Journal of Materials Chemistry, 2011, vol. 21, pp. 2489-2494.

Mohamari, et al., "Removal of phosphorus from aqueous solution by Iranian natural adsorbents," Chemical Engineering Journal, 2013, 223, pp. 328-339.

Knowlton, et al., "Thermal Study of Types of Water Associated with Clinoptilolite," Clays and Clay Minerals, vol. 29, pp. 403-411 (1981).

Lin, et al., "Study on Channel Features and Mechanism of Clinoptilolite Modified by $LaCl_3$," Journal of Materials Science Research, 2013, 2 (4), 37-44.

Zhang, et al, "Adsorption behavior of phosphate on Lanthanum(III) doped mesoporous silicates material," Journal of Environmental Sciences, 2010, 22(4). 507-511.

Trigueiro, et al, "Thermal stability of Y zeolites containing different rare earth cations," Journal of alloys and compounds, 2002, 344, 337-341.

Narin, et al, "Characterization and Dehydration Behavior of a Natural, Ammonium Hydroxide, and Thermally Treated Zeolitic Tuff," Drying Technology, 29: 553-565, 2011.

General Information on Phosphorus by Sheila Murphy last updated Monday Apr. 3, 2007.

Wisconsin DNR, "Reducing Phosphorus to clean up lakes and rivers," <https://dnr.wi.gov/news/mediakits/mk_phosphorus.asp> webpage available at least as early as Dec. 9, 2010.

Pollution in the Great Lakes Basin from Land Use Activities. Report of International Joint Commission. Mar. 1980.

Sing, et al, "Reporting Physisorption Data for Gas/Solid Systems with Special Reference to the Determination of Surface Area and Porosity," Pure applied chemistry, 1985, 57, 603.

Smith, et al. "Rating impacts in a multi-stressor world: a quantitative assessment of 50 stressors affecting the Great Lakes," Ecological Applications (2015) 25: 3.

Schock, et al, "Impacts of Agricultural Drainage Outlets on Great Lakes Coastal Wetlands," Wetlands (2014) 34: 297.

Young, et al, "Algal-availability of particulate phosphorus from diffuse and point sources in the lower Great Lakes basin," Hydrobiologia (1982) 91: 111.

Great Lakes Environmental Assessment and Mapping (GLEAM) Project, <http://www.greatlakesmapping.org>, webpage available at least as early as Dec. 30, 2012.

International Preliminary Report on Patentability for Application No. PCT/US2017/036793 dated Dec. 20, 2018 (7 pages).

International Search Report and Written Opinion for Application No. PCT/US2017/036793 dated Sep. 1, 2017 (14 pages).

\* cited by examiner

POROUS DECONTAMINATION REMOVAL COMPOSITION

CROSS REFERENCE TO RELATED APPLICATIONS

This application is the U.S. national stage entry, under 35 U.S.C. § 371, of international application number PCT/US2017/036793, filed Jun. 9, 2017, which claims priority to U.S. Provisional Application No. 62/348,032, filed Jun. 9, 2016, the entire contents of which are hereby incorporated by reference in their entirety.

BACKGROUND

Zeolite materials are known sorbents with applications for unmodified and modified zeolites, including the removal of contaminants. Such contaminants include lead, perchlorates, phosphates, zinc, mercury, cadmium, chromium, and copper and/or the complexes of these metal ions. The porous nature of zeolites allows for adsorption of contaminants in fluid as the contaminated fluid is exposed to zeolite. The type of contaminants natural zeolite may adsorb depends on the pore structure, the chemical interaction between the contaminant and the natural zeolite, and the physical structure of the contaminant. Natural zeolite is limited in its ability to effectively adsorb only certain types of contaminants and the amounts of those contaminants. That means that the adsorption capacity of given contaminants is restricted and limited.

Modified zeolite materials may be functionalized by binding specific compounds known to physically and/or chemically interact with target contaminants to the surfaces of zeolite. Target contaminants flowing through the modified zeolite interact with the compound causing the target contaminant to bind to the compound which is bound to the zeolite, removing the target contaminant from the fluid. Modified zeolites can capture contaminants not possible with natural zeolite and may have increased contaminant capacity compared with natural zeolite. The increase in contaminant capacity depends on the target contaminant, fluid, and functionalizing compound.

Current modified zeolites have limited performance in capturing contaminants in environments where the pH is very acidic or very basic and have contaminant capacities limited to around 1% to 2% of the mass of the modified zeolite. To treat contaminated fluid with pH levels above or below their stability ranges, typically below pH 4 or above pH 10, an acid or alkali buffer is added to change the pH to a level in which the modified zeolite may interact with contaminants without chemically and structurally damaging the modified zeolite. This is a major limitation for the regeneration of the materials.

Current modified or functionalized zeolite materials cannot be easily recycled and are typically disposed of after being saturated with the contaminants. The ability to release contaminants under specific conditions would allow for the zeolite and zeolite modified materials to be reused. It would also allow for the recovered contaminant to be recycled. The removal of contaminants would also allow for a reduction in the disposed material's total weight.

Functionalization of zeolite materials, reported to date, results in materials that function within a limited pH range, requiring the addition of a buffering agent in the contaminated water prior to treatment, or materials that are only suitable for gas phase operations. The buffering agent increases operational cost and time required to process and remove contaminants from water, and it also restricts the recovery of adsorbed materials.

Additionally, functionalized zeolites prepared at temperatures greater than 600° C. often result in a slight collapse in meso-structure collapse and a corresponding decrease in surface area (Yang, J. et al., "A designed nanoporous material for phosphate removal with high efficiency," Journal of Materials Chemistry, vol. 21, pp. 2489-2494 2011). The removal of contaminants by adsorption is also limited by the available zeolite surface area, with lower surface areas materials resulting in lower total contaminants removal before zeolite saturation is reached. Therefore it would be beneficial to have a modified zeolite material capable of removing contaminants, where the material has increased adsorption capacity due to both surface modification and increased surface area and the ability to recycle the collected contaminant and where required or advantageous the adsorbent.

SUMMARY

In one embodiment, the invention provides an enhanced zeolite including a zeolite and one or more metal oxides. The metal oxides may be present in the form of nanomaterials which may be nanoparticles, simple or complex nanosheets or nanowires or combinations thereof.

In another embodiment, the invention provides a method of removing phosphorous from water or wastewater including contacting the water or wastewater with an enhanced zeolite including zeolite and metal oxide.

In another embodiment, the invention provides a method of regenerating an enhanced zeolite including zeolite and lanthanum oxide. The method includes removing phosphorous from lanthanum phosphate in a solution including the enhanced zeolite, oxidizing lanthanum in the solution including the enhanced zeolite, and precipitating phosphorous from the solution.

In another embodiment, the invention provides a method of manufacturing an enhanced zeolite including mixing a precursor zeolite into a mixture of a solution of a lanthanum salt and an alcohol, stirring the mixture at a temperature greater than 60° C., and calcining the mixture.

Other aspects of the invention will become apparent by consideration of the detailed description and accompanying drawings.

DETAILED DESCRIPTION

Figure 1:
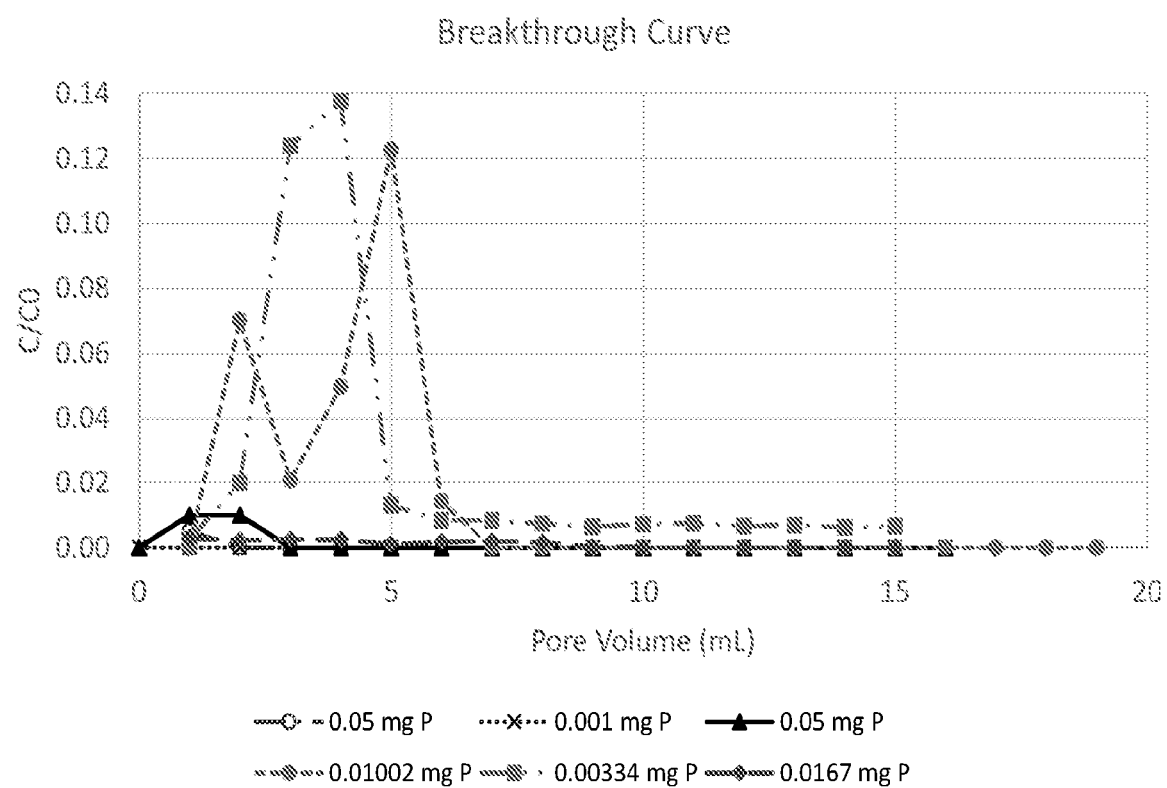
FIG. 1 shows breakthrough curves performed with different total loads of phosphorus (P).

Before any embodiments of the invention are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

The present disclosure relates to purification and decontamination of fluid environments. More specifically the invention relates to an enhanced zeolite material for the removal of contaminants from water in applications including drinking water treatment, wastewater treatment, storm water management, in-situ remediation, and water treatment in recirculating aquaculture systems. The enhanced zeolite includes zeolite and a metal oxide.

In one aspect, the disclosure provides an enhanced zeolite. The enhanced zeolite comprises a zeolite and a metal oxide. The metal oxide may be a rare earth metal oxide or an alkaline earth metal oxide. For example, the metal oxide may be an oxide of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y). The metal oxide may be an oxide of magnesium (Mg), calcium (Ca), strontium (Sr), and barium (Ba). The metal oxide may be iron oxide, cobalt oxide and manganese oxide. In one embodiment, the metal oxide comprises lanthanum oxide. In embodiments more than one metal oxide may be present. The metal oxides may be present in the form of nanomaterials which may be nanoparticles, simple or complex nanosheets or nanowires or combinations thereof.

Suitably, metals to be used in the metal oxides should be chosen such that they have a small solubility product ($K_{sp}$) for the targeted contaminants. For example, the $K_{sp}$ may be less than about $10^{-15}$. In other embodiments, the $K_{sp}$ may be from about $10^{-11}$ to about $10^{-30}$.

The enhanced zeolite according to the present disclosure may have an increased capture capacity as compared to prior zeolites. (Mohamari and Jalali, 2013, Chemical Engineering Journal, 223, pg. 328-339). The capture capacity may be about 5 times higher than prior zeolites or about 10 times higher than prior zeolites. The enhanced zeolite according to the present disclosure may have an increased chemical and/or thermal stability as compared to prior zeolites. For example, the enhanced zeolites of the present disclosure may be stable below about pH 4 and/or above about pH 10. For example, the enhanced zeolites of the present disclosure may be stable above about 450° C. or about 500° C.

In certain embodiments, the metal oxide may be lanthanum oxide, magnesium oxide, iron oxide, mixed metal oxides including all lanthanides or any combination thereof. In certain embodiments, the metal oxide may be replaced by a metal chloride or a metal sulfate. The metal chloride may be $MgCl_2$, for example. The metal sulfate may be $MgSO_4$, for example.

In an aspect, the disclosure also provides a method of removing contaminants, such as anionic or oxyanionic species, including, but not limited to, phosphates, arsenates, borates, and selenates, from a fluid. In certain embodiments, a range of metal-zeolite materials made of different types of zeolites may be used. In certain embodiments, varying zeolite particle sizes may be used.

The fluid may be an aqueous mixture, such as water. The fluid may also include organic solvents, such as those that form soluble mixtures with water. The fluid may also be air or another gas. In certain embodiments contaminants may include phosphorus. The method may be used to remove contaminants from a body of water. The body of water may be a waterway, pond (e.g. a sediment or nutrient catchment pond), lake, reservoir, or other body of water. The enhanced zeolite may be used in drains. The enhanced zeolite may be placed over outlets. The enhanced zeolite may be placed on the sides or bottom of structures. The enhanced zeolite may be used as an in situ amendment.

The enhanced zeolite material may be used for the removal of a contaminant from water and wastewater where the influent is passed through a column filter containing the enhanced zeolite material. The enhanced zeolite may remove polyphosphate, anaerobic phosphorus, different complexes with metals and phosphorus, adsorbed phosphorus desorbed from clay, and biological or biochemically bound phosphorus for example, such as found in algae and bacteria. The enhanced zeolite may be used in conjunction with other modified zeolites to remove anions, carbon based materials or metals. Complex modifications to a zeolite of which this is one embodiment may be fabricated to provide multifunctional properties, one of which is phosphorus removal.

In embodiments, the enhanced zeolite may be used in combination with a filter, for example a pre-filter or a two-stage geotextile. The two-stage geotextile may include a more porous outer layer and a less porous inner layer. The filter may provide for gross solid removal and capture. The filter may catch algae, bacteria, or other debris. The capture of algae, bacteria, or other debris may keep the modified zeolite active.

Alternately, the enhanced zeolite material may be placed in a permeable or semi-permeable fabric which is then placed in contaminated water. Additionally, or alternately, the enhanced zeolite may be placed in a "tea bag" structure. The bags may be used in combination with flotation pouches to buoy the bags in a body of water. The bags may be tethered to anchors in a body of water.

In an aspect, the disclosure provides a method for the regeneration of the enhanced zeolite material. For example, the enhanced zeolite material may be regenerated in solution by evolving the contaminant from the metal salt, oxidizing the metal, and precipitating the contaminant from the solution. The precipitate may then be separated from the regenerated enhanced zeolite material. A regenerated enhanced zeolite material is typically washed and dried prior to removing more contaminant from the fluid. In some embodiments, the enhanced zeolite material may be regenerated at least about 3 times, or at least about 6 times or at least about 10 times. In some embodiments, the enhanced zeolite material may be regenerated up to about 15 times, up to about 10 times or up to about 6 times.

In an aspect, the phosphorous may be recovered from the enhanced zeolite. The enhanced zeolite may also be used for polyphosphate capture. The enhanced zeolite may be used for anaerobic phosphorous capture and removal. The enhanced zeolite may be used for capture of adsorbed phosphorous. Adsorbed phosphorous may include phosphorous adsorbed onto sediments, such as clay. Adsorbed phosphorous may include phosphorous desorbed from clay. The enhanced zeolite may be effective for removal of complexed phosphorous. Complexed phosphorous may include complexes of metal and phosphorous. The enhanced zeolite may be used for removal of phosphorous from algae or bacteria.

In an aspect, the disclosure provides a method of manufacturing an enhanced zeolite, and more particularly La-zeolite, for contaminant removal from fluids. The method may comprise: mixing zeolite into a solution of metal salts and alcohol, stirring the mixture at a temperature greater than about 60° C., suitably at about 100° C., with a preferred mixing speed around 125 rpm, until dry, calcining the dried mixture at a temperature between about 650° C. and about 1200° C., suitably around about 800° C. for about 2 hours, washing the calcined mixture with alcohol, centrifuging the washed mixture, and drying the centrifuged mixture.

In certain embodiments, the amount of time the mixture is stirred at a temperature greater than about 60° C. for about 24 hours. In yet another embodiment, the disclosure provides a method of manufacturing an enhanced zeolite, and more particularly La-zeolite, for the removal of contaminants from fluid, comprising mixing zeolite, metal salt and alcohol, stirring the mixture until dry, calcining the dried mixture at a temperature between about 650° C. and about 1200° C., washing the calcined mixture with an alcohol or aqueous solution, and drying the washed mixture.

In yet another embodiment, the disclosure provides a method of manufacturing an enhanced zeolite, and more particularly La-zeolite, for the removal of contaminants from fluid, comprising dissolving metal salt in ethanol, mixing the resulting mixture with zeolite, drying the mixture at a temperature greater than about 60° C., heating the dried mixture at a temperature between about 650° C. and about 1200° C., washing the heated mixture in ethanol, centrifuging the washed mixture, and drying the centrifuged mixture at a temperature greater than about 60° C.

The calcination temperature of the mixture may affect how well the metal, in particular, lanthanum, binds to the zeolite structure. If the calcination temperature is too low, the resulting product typically has an excess of metal or agglomerated metal on the zeolite structure, rather than having a smooth and evenly distributed surface coating. In certain embodiments, the calcination temperature is between about 650° C. and about 1200° C. A suitable calcination temperature is about 800° C.

In one embodiment, the metal salt is slowly crystallized from alcohol onto the zeolite. In embodiments, the metal salt is crystallized for a period of time over about 2 hours, or over about 4 hours, or over about 8 hours, or over about 12 hours. In embodiments, the metal salt is crystallized for about 2 to about 24 hours, or about 4 to about 24 hours, or about 8 to about 24 hours, or about 12 to about 24 hours. In some embodiments, the metal salt is crystallized for about 1 to about 3 day. Without wishing to be bound by theory, it is thought that the slow crystallization results in individual or clusters of nanoparticles of the metal salt on the zeolite. In embodiments, the nanoparticles are about 10 to 20 nanometers in size. Under some circumstances the particles may coalesce to form complex structures.

In certain embodiments the metal salt includes at least one lanthanum salt. In certain embodiments the lanthanum salt is lanthanum nitrate hexahydrate. In certain embodiments the alcohol comprises ethanol. In certain embodiments, the alcohol comprises isoamyl alcohol. In certain embodiments washing the calcined mixture with alcohol removes excess metal particles from the zeolite. In certain embodiments the ratio of zeolite to metal salt in the solution is about 4 to about 1 by mass (about 25% metal salt by mass of zeolite). In embodiments, about 25% by mass of lanthanum salt may produce an enhanced zeolite with about 7.5% La.

Suitably, the percentage of lanthanum nitrate hexahydrate to zeolite by mass is about 25% to yield good capacity performance. Zeolite used for making the enhanced zeolite material suitably has a Mohs hardness between about 4 and about 7, and more suitably between about 6 and about 7.

In certain embodiments, cleaning is used to present cleaned surfaces for nano-crystallization on the surface of the zeolite. In the absence of a clean surface, the salts may not attach and will appear as "free metal," easily washed off and resulting in a lowered contaminant exchange capacity. For example, the removal of aluminum from zeolite may open zeolite pores and increase availability of lanthanum and lanthanum compounds to attach to the zeolite structure. In certain embodiments, the cleaning method includes deionized water at room temperature washing with sonication (up to about 10 times), followed by hot water with microwave heating from room temperature to boiling (up to about 10 times). Then the material may be dried at about 100° C. for about 24 hours to about 2.8% moisture and stored. In embodiments, the zeolite may be cleaned with acid (e.g hydrochloric acid, nitric acid or sulfuric acid) or with base (e.g. sodium hydroxide).

In certain embodiments, $La(NO_3)_3 \cdot 6H_2O$ may be used as the lanthanum salt and incorporated into the cleaned zeolite using the rapid ethanol evaporation method. In certain embodiments, clean zeolite is added into the ethanol solution containing lanthanum salt in a ratio of about 1 to about 4 by mass or about 25% of the zeolite mass. The mixture may be stirred at 125 rpm at about 100° C. for up to about 24 hours, until the ethanol is entirely evaporated. The dried product after ethanol evaporation may be calcined at about 800° C. for about 2 hours. The calcined product may be vortex washed with absolute alcohol, e.g. three times followed by centrifugation, so as to remove any unattached lanthanum dust from the zeolite surface. The washed product may then be dried at about 100° C. for about 24 hours.

The time to evaporate may depend on equipment and surface areas. In certain embodiments, the time may be optimized for the actual process or equipment in use. Some of the procedures disclosed herein are based on a rotating muffle furnace starting from room temperature and others on a furnace with no rotation features. In certain embodiments, functionalized zeolite may be manufactured with an industrial scale production system.

Other suitable methods of synthesizing the enhanced zeolites are known to those skilled in the art. For example, several methods of generation of metal oxides in or on zeolites have been established, including solution precipitation or incipient wetness impregnation. In the former, a liquid metal precursor solution and another precursor are dropped simultaneously into a solution to generate particles on contact. If a zeolite present in suspension and if the pH is adjusted correctly, particles may be generated that would stick on the outside of the zeolite particles. These materials can be calcined in air or oxygen to give metal oxide particles.

A suitable practice of the latter includes establishing the pore volume of the zeolite and creating a solution of deposition concentration such that the zeolite can absorb all of that solution. The zeolite is dried to maintain a uniform distribution of precursor throughout the dried sample surface area. During all calcination processes in air or oxygen, the potential exists for metal particles to migrate and the final product may produce a distribution of particles both inside and outside of the zeolite.

The following non-limiting examples provide additional information on the enhanced zeolites described herein. Adsorption experiments—batch or column—as described here were performed at 21° C. Adsorption experiments will be performed similarly at 4° C. (inside refrigerator) and 40° C. (inside incubator) to evaluate interference of temperature on the performance of the adsorbent.

EXAMPLES

Example 1. Kinetics of Phosphorus Removal from Aqueous Solutions

The kinetics of removal of phosphorus from aqueous solutions using a column method with a fixed bed of La-zeolite and clean zeolite has been examined. Column experiments were run using a 15-cm column (Synthware) with a mini-pump (Control Company mini-pump, variable flow). The columns were run by inserting a small piece of cotton gauze in the bottom and layering the adsorbent over the top up to a predesignated fill line. Water was run through the column until the entire length had been penetrated, then the valve was closed and the column filled with water to invert the adsorbent to prevent preferential flow paths being formed which allowed full exposure of the phosphors-contaminated water to the adsorbent. The columns were run with a consistent flow rate of 0.08 (+/−0.03) mL/s and spike solutions were monitored. Pore volume samples were collected and analyzed using UV Vis Spectrophotometer (Evolution).

Figure 2:
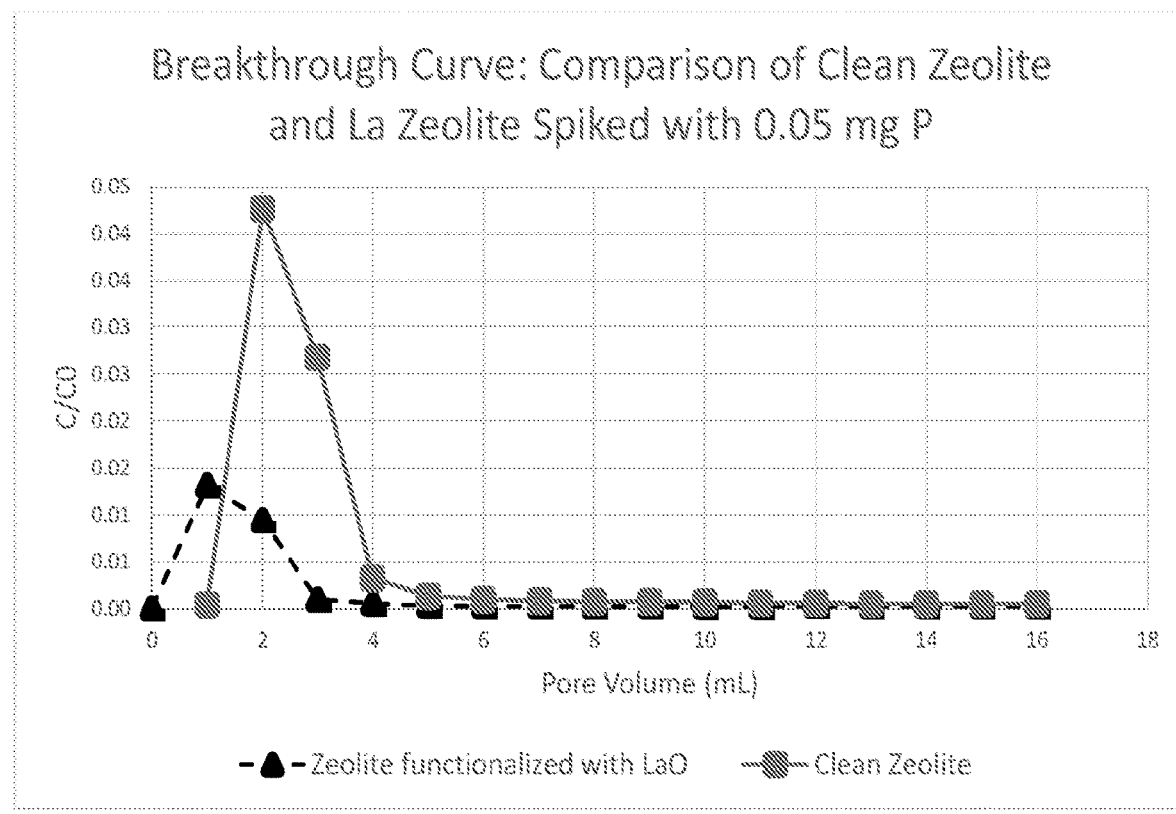
FIG. 2 shows a comparison between a breakthrough curve of clean zeolite and La-zeolite when the column is spiked with 0.05 mg of phosphorous (P).

Experimental results are presented as breakthrough curves in FIG. 1 and FIG. 2. FIG. 1 shows breakthrough curves performed with different loads of phosphorus. The removal of phosphorus by La-zeolite is always higher than the mother particle—clean zeolite. The breakthrough takes place between pore volume 1 and 6. FIG. 2 shows a comparison between a breakthrough curve of clean zeolite and La-zeolite. Clean zeolite has a higher breakthrough (higher peak), having lower adsorption capacity for the same phosphorus load.

Example 2. Synthesis of La-Zeolite at Different Calcination Temperatures

Figure 3:
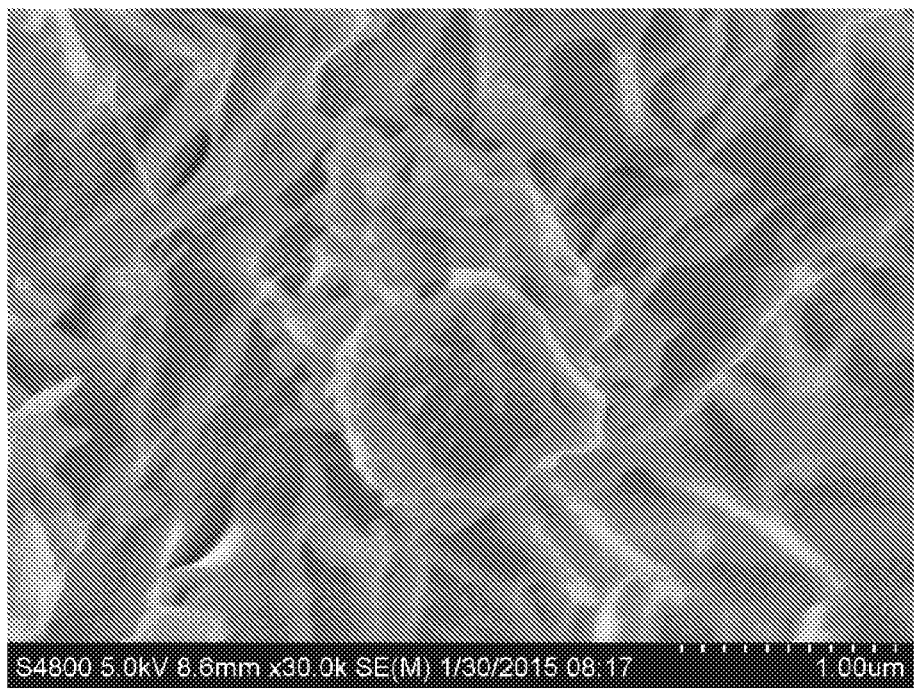
FIG. 3 shows an SEM image of La-zeolite with 25% lanthanum nitrate hexahydrate by mass of zeolite prepared with a calcination temperature of 800° C. for 2 hours.
Figure 4:
FIG. 4 shows an SEM image of La-zeolite with 25% lanthanum nitrate hexahydrate by mass of zeolite prepared with a calcination temperature of 650° C. for 2 hours.
Figure 5:
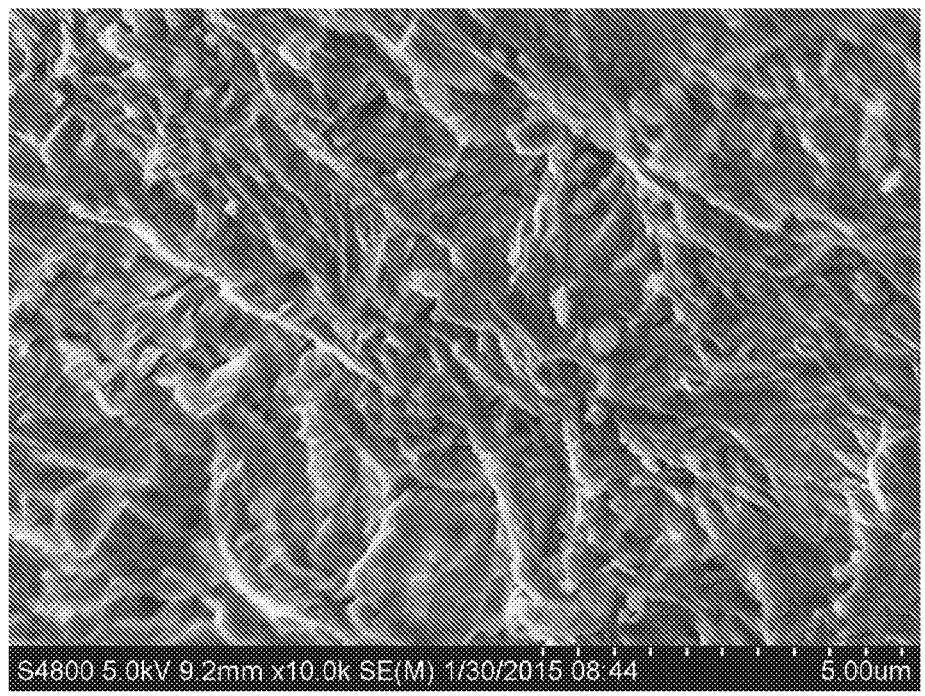
FIG. 5 shows an SEM image of La-zeolite prepared with no lanthanum salt and prepared at an 800° C. calcination temperature for 2 hours.
Figure 6:
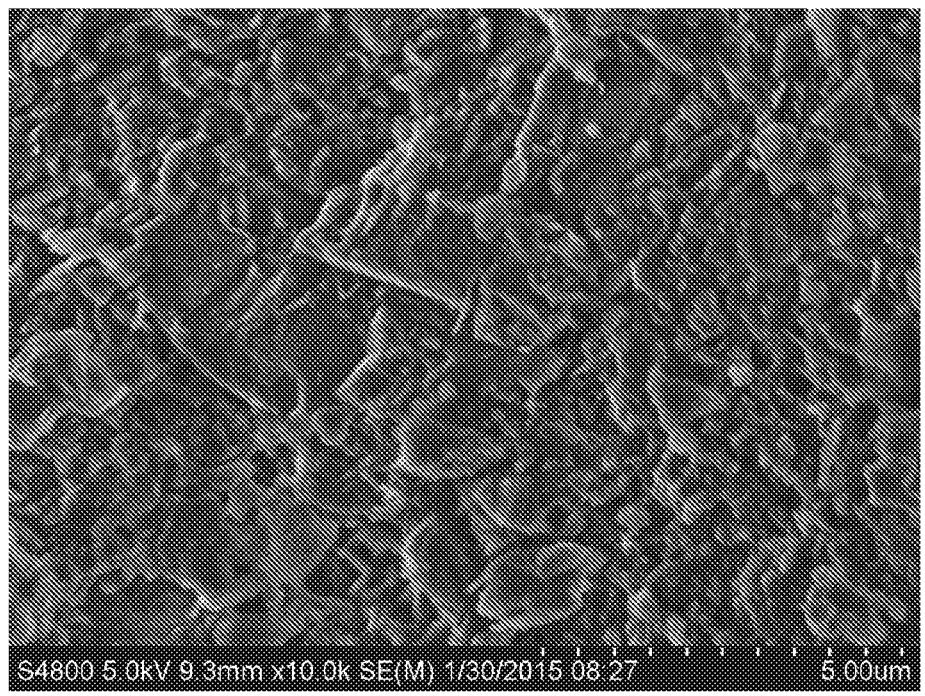
FIG. 6 shows an SEM image of La-zeolite with 25% lanthanum nitrate hexahydrate by mass of zeolite prepared with a calcination temperature of 450° C. for 2 hours.

FIG. 3 shows La-zeolite, with 25% lanthanum nitrate hexahydrate by mass of zeolite, prepared with a calcination temperature of 800° C. The particles in FIG. 3 are evenly coated and some lanthanum nanowires were observed. Where the calcination temperature is about or less than 650° C. (FIG. 4), the zeolite structure appears to have excess lanthanum on the zeolite surface, which may be in the form of blocks or agglomerated lanthanum. FIG. 5 shows La-zeolite prepared with no lanthanum salt and prepared at an 800° C. calcination temperature. The surface of the La-zeolite material in FIG. 5 does not appear to have La present, as expected. FIG. 6 shows La-zeolite with 25% lanthanum nitrate hexahydrate by mass of zeolite prepared with a calcination temperature of 450° C. for 2 hours.

Where the calcination temperature is lower than 650° C., the morphology and structure of the material may vary, resulting in altered capacity retention of phosphorus in thezeolite structure. In one example, calcination at 350° C., 450° C., and 650° C. (FIG. 4) visually appears to have excess lanthanum on the surface of the structure and does not appear to have a smooth coating. The example with a 650° C. calcination temperature shows that the excess lanthanum took block form.

Example 3. Comparison of La-Zeolite and Clean Zeolite

Figure 7:
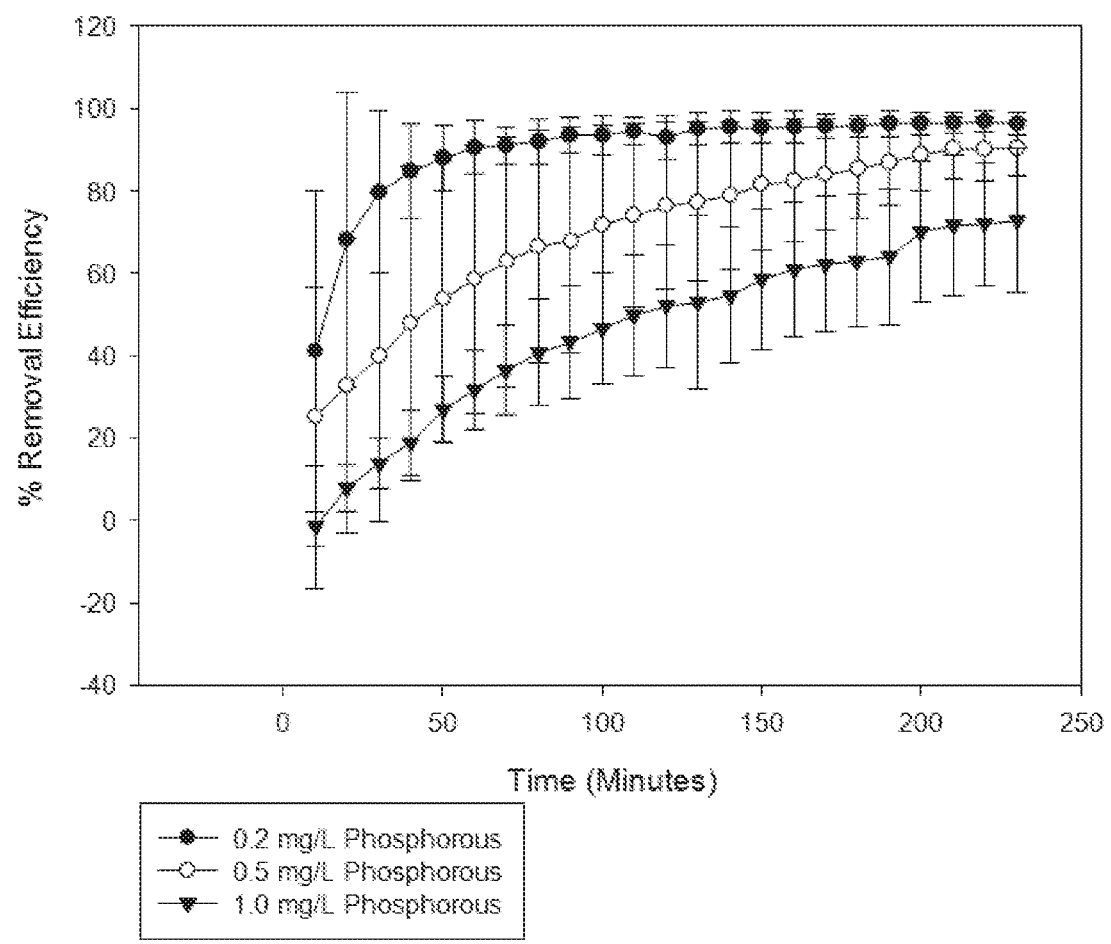
FIG. 7 shows a plot of removal efficiency of phosphorus by La-zeolite prepared with 25% lanthanum nitrite hexahydrate measured at various concentrations of phosphorus in water.

Column experiments as described in Example 1 were performed with both La-zeolite and clean zeolite particles. Details are presented in Table 1 and Table 2. The removal efficiency of phosphorus by La-zeolite prepared with 25% lanthanum nitrite hexahydrate was measured at various concentrations of phosphorus in water, FIG. 7. Batch experiments were carried out to evaluate the adsorption performance of the adsorbent. A stock solution of 100 mg·L$^{-1}$ phosphorus was prepared in ultrapure water and subsequent dilutions were prepared at the following concentrations: 0.005, 0.01, 0.05, 0.1, 0.5, 1, 5 mg·L$^{-1}$. A calibration curve of absorbance against concentration of phosphorus was plotted ($R^2$=0.999). 500 mL stock solution of a given concentration (eg. 1 mg·L$^{-1}$) was stirred with 0.1 g of 25% Lanthanum coated zeolite. The mixture was continuously stirred on a magnetic stir plate for 230 min with a constant stirring rate of 300 rpm at room temperature (21° C.) and at natural pH. 2.5 mL aliquots were taken even 10 min, and the supernatant was analyzed for residual phosphorus concentration. Concentrations of phosphorus in the supernatant solutions were estimated by measuring absorbance at maximum wavelengths of the phosphorus ($\lambda_{max}$=885 nm) using the calibration curve. A single beam thermo scientific evolution UV/Vis spectrophotometer with a 10 cm cuvette was used to measure absorption of 0.005, 0.01 mg·L$^{-1}$ concentrations for calibration curve. A 1 cm path length cuvette was used for measuring all remaining concentrations on calibration curve and all residual phosphorus concentration samples.

The experiment used a filter column setup where 11 grams of La-zeolite was available in the column and water contaminated with phosphorus was passed through the filter column. The removal efficiency of the La-zeolite for the removal of phosphorus is higher than the other particle—clean zeolite.

TABLE 1

Column experiments using La-zeolite particles. The columns were spiked with deionized water containing various known concentrations of phosphorous (P).
Lanthanum Coated Zeolite Column Experiments

| Date | Type of water | Concentration of P solution used to spike the column | Load P (mg) | % Removed |
|---|---|---|---|---|
| Feb. 19, 2016 | DI | 1 mL 5 mg/L | 0.0500 | 67 |
| Feb. 22, 2016 | DI | 3.34 mL of 1 mg/L | 0.0033 | 97 |
| Feb. 26, 2016 | DI | 1 mL 1 mg/L | 0.0010 | 100 |
| Mar. 7, 2016 | DI | 1 mL of 50 mg/L | 0.0500 | 94 |
| Mar. 11, 2016 | DI | 10.02 mL of 1 mg/L | 0.0100 | 100 |

TABLE 1-continued

Column experiments using La-zeolite particles. The columns were spiked with deionized water containing various known concentrations of phosphorous (P).
Lanthanum Coated Zeolite Column Experiments

| Date | Type of water | Concentration of P solution used to spike the column | Load P (mg) | % Removed |
|---|---|---|---|---|
| Mar. 21, 2016 | DI | 3.34 mL of 1 mg/L | 0.0033 | 100 |
| Mar. 25, 2016 | DI | 16.7 mL of 1 mg/L | 0.0167 | 100 |

TABLE 2

Column experiments using clean zeolite particles (without La functionalization). The columns were spiked with deionized water containing known concentrations of phosphorous (P).
Clean Zeolite Column Experiments

| Date | Type of water | Concentration of P solution used to spike the column | Load P (mg) | % Removed |
|---|---|---|---|---|
| Apr. 22, 2016 | DI | 1 mL of 50 mg/L | 0.0500 | 53 |

Column-specific pore volume (CV) was initially measured by taking the absolute weight difference of the column apparatus filled with dry porous material and the same apparatus filled with water. This value is given in mL for laboratory columns. This value was measured to be 3.4 mL and was used for all breakthrough calculations. To perform column experiments, the same procedure was used each time. The column was filled with fresh particles and deionized water was pumped through to wet them. The desired concentration of phosphorus was used to spike the column, pore volumes were filtered by gravity, and samples were collected. Absorbance was measured using UV-visible spectroscopy. A breakthrough curve was plotted using data obtained from measuring absorbance of various concentrations of phosphorus, again using UV-visible spectroscopy. Results of these column experiments are outlined in Tables 1 and 2 and FIG. 7.

Example 4. Thermal Stability of La-Zeolite

Figure 8:
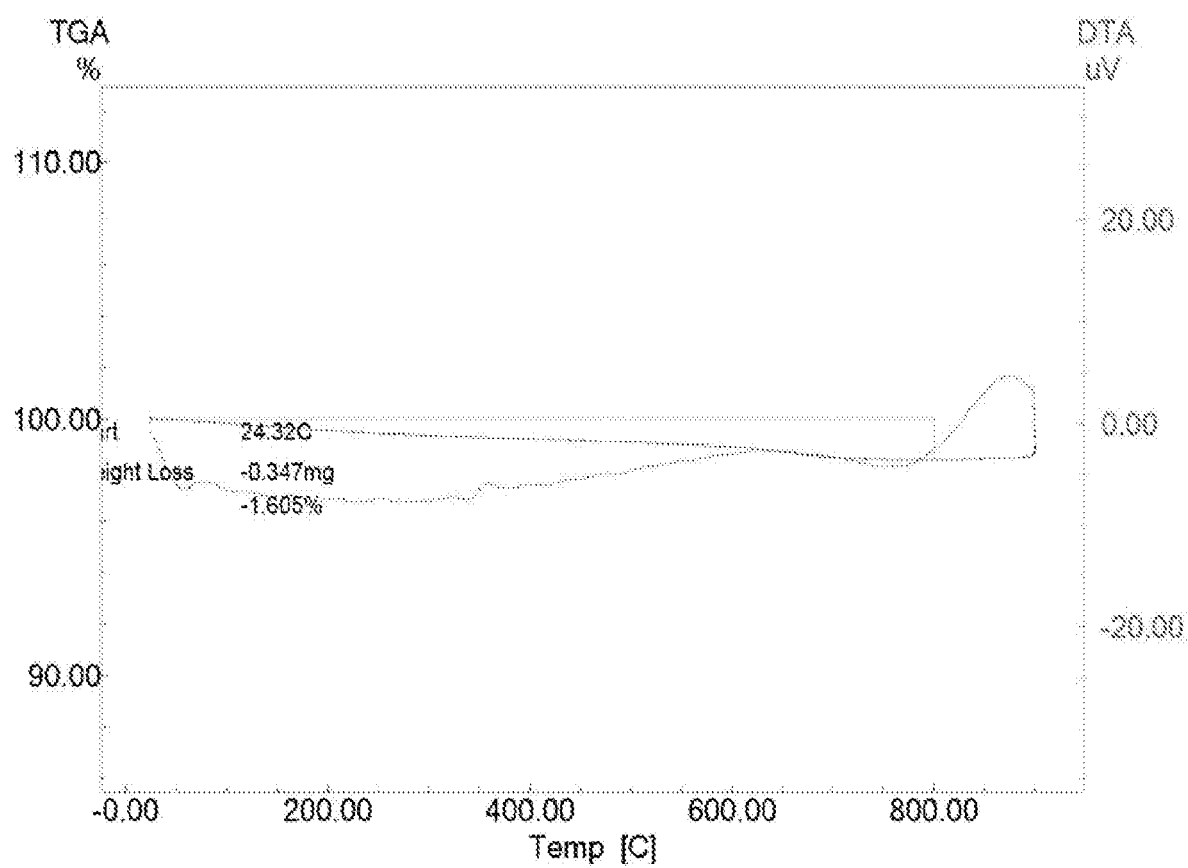
FIG. 8 shows the thermal stability of 25% La-zeolite calcined at 800° C. for 2 hours, by thermogravimetric analysis and differential thermal analysis. The mass loss is less than 2%.
Figure 9:
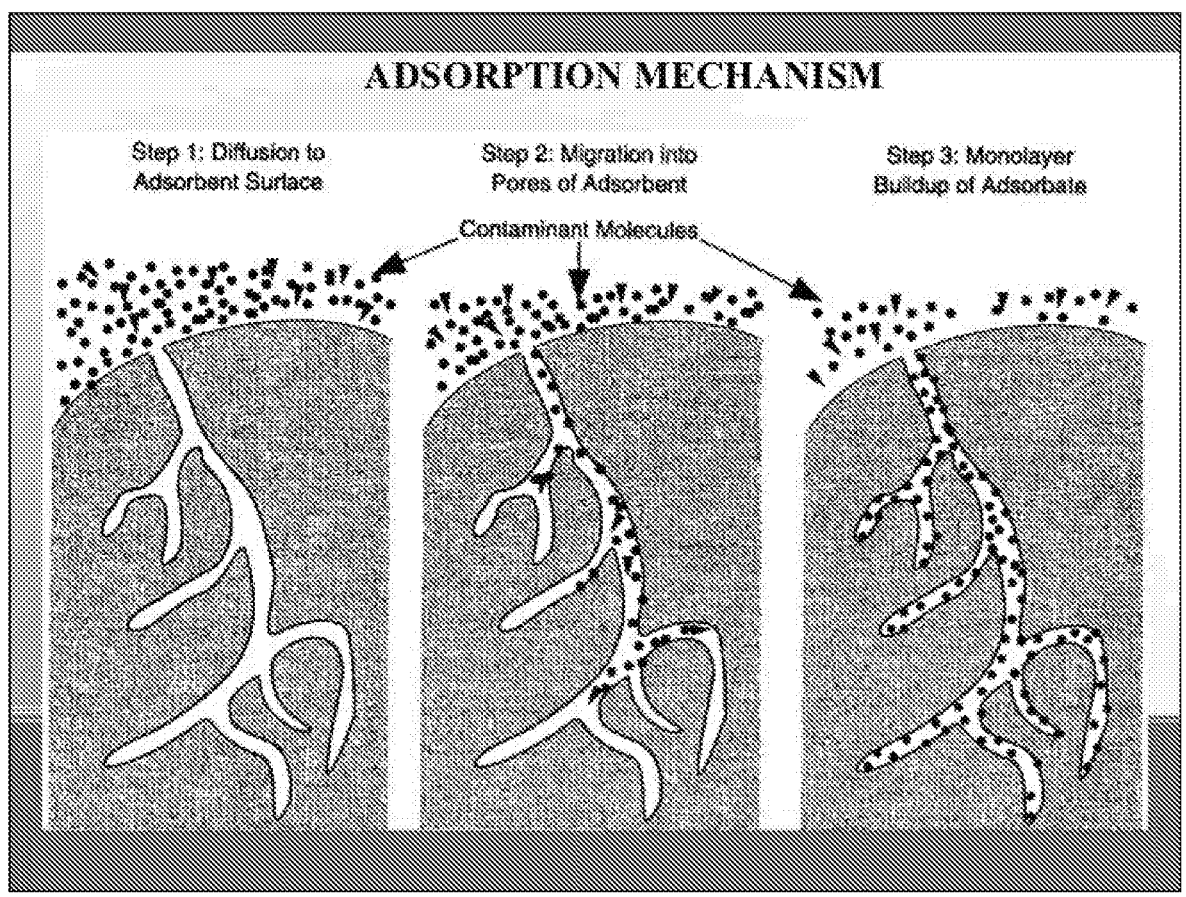
FIG. 9 shows a schematic illustration of an adsorption mechanism.

The thermal stability of La-zeolite was studied with thermogravimetric analysis and differential thermal analysis, FIG. 8. The La-zeolite sample had a mass of 216.2 mg. The total mass lost in the sample was 0.347 mg, a total mass loss of only 1.605%. The thermogravimetric analysis shows a La-zeolite mass loss of less than 2% at 800° C., which shows that the La-Zeolite is thermally stable at 800° C. relative to the thermal stability at around room temperature. It is also evident that all water content was lost from the precursor at early temperatures before the stable intermediate temperature range, between 200° C. and 370° C., and no extra intermediate transitions were observed within that range. The low temperature portion (less than about 50° C.) of the curve represents desorption of water from the surface of the grains in the powdered sample. The middle portion (between about 50° C. and about 200° C.) represents desorption of "loosely bound zeolite" water. The high temperature portion (from about 200° C. to about 700° C.) represents the slow desorption of water from the clinoptilolite component of the sample. This water is referred to as "tightly bound zeolite" water (KNOWLTON, G. D. et al., "Thermal Study of Types of Water Associated with Clinoptilolite," Clays and clay minerals, vol. 29, pp. 403-411 (1981)).

Example 5. Regeneration of La-Zeolite

Figure 11:
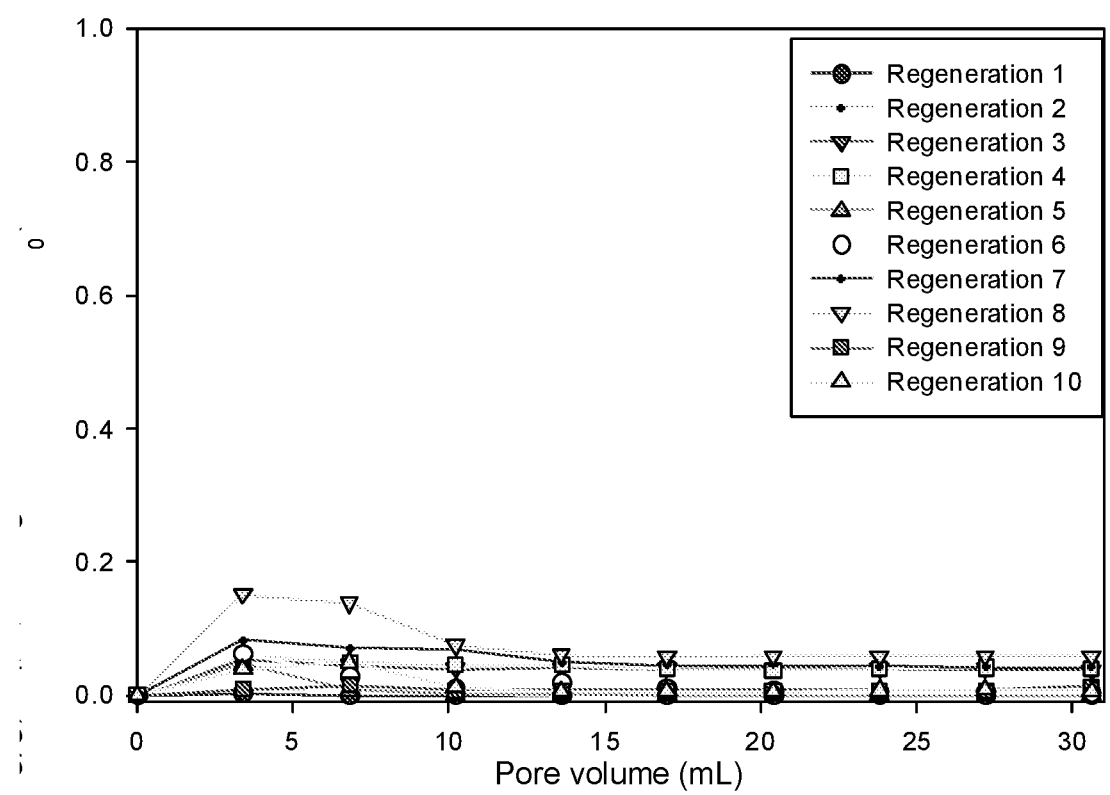
FIG. 11 shows breakthrough curves for regenerated La-zeolite.

FIG. 11 shows results of a repeated column experiment. After a first and a second regeneration of the La-zeolite material, phosphorous was completely retained from the water. After a third and a fourth regeneration cycle, the La-zeolite material was 5% less efficient at retaining phosphorous. The regeneration of the material was evaluated by first running a column experiment using the procedure described earlier. After completion of the column experiment the adsorbent material used in the experiment was taken and placed in a rotary furnace for five hours at 550° C. for regeneration. Analysis of the column experiment samples was also completed using an UV Vis Spectrophotometer (Evolution). After completing the repeat test the results were analyzed and compared with the previous column runs performance to determine the percent capacity for adsorption that was maintained.

Example 6. Lanthanum Desorption

La-zeolite with 25% lanthanum nitrate hexahydrate of zeolite by mass was placed into 100 mL of deionized water, and the pH was adjusted to the desired levels by adding either 0.1 M NaOH or 0.1 M HCl. The amount of La-zeolite added to the water was 10 mg. The resulting solutions were stirred for 24 hours at 125 rpm followed by filtering through a 0.45 µm filter. The filtered solution was tested for lanthanum using inductively couple plasma mass spectroscopy. Results are shown in Table 3. The material sample titled "Desorption pH2" was a repeat of the Lanthanum desorption test at a pH level of 2.

TABLE 3

Desorption of lanthanum from La-zeolite material under various conditions. The initial concentration of lanthanum in solution was 250,000 µg/L.

| MATERIAL SAMPLE | CONCENTRATION OF LANTHANUM (µg/L) | LANTHANUM DESORBED (%) |
|---|---|---|
| DI water, stirred at 125 rpm | 12.7 | 0.005% |
| DI water, stirred at 250 rpm | 66.9 | 0.026% |
| DI water, Vortexed | 3.4 | 0.001% |
| Desorption pH2 | 269 | 0.108% |
| Poorly Prepared La-Zeolite | 36.7 | 0.014% |
| pH 2 | 78.2 | 0.031% |
| pH 4 | 12.0 | 0.005% |
| pH 6 | 4.09 | 0.002% |
| pH 8 | 1.86 | 0.001% |
| pH 10 | 2.97 | 0.001% |
| pH 12 | 0.447 | 0.0002% |

Lanthanum desorption from La-zeolite to solution was also tested in a pH-neutral deionized water solution under various mixing conditions including: 125 rpm stirring for 24 hours, 250 rpm stirring for 24 hours, and vortex mixing at low setting for a few minutes followed by filtering. Inductively coupled plasma mass spectroscopy was used to determine the amount of lanthanum desorbed from La-zeolite.

The material sample in Table 3 titled "Poorly Prepared La-Zeolite" is a desorption test conducted on La-zeolite that was prepared without the calcination step. The poorly prepared La-zeolite was tested by placing a 10 mg sample into 100 mL of deionized water, followed by stirring at 125 rpm for 24 hours, and then filtering with a 0.45 µm filter, with the resulting solution checked for lanthanum using inductively coupled plasma mass spectroscopy. Lanthanum leaching out of the La-zeolite particles was very low to negligible when exposed to a broad range of pH (2 to 10) and when subject to a variety of mixing conditions and preparation.

Example 7. Effect of Lanthanum on Surface Area

The nitrogen sorption measurements of the 25% La-Zeolite that was calcined at 800° C. for 2 h revealed a decrease of 39% in the surface area when compared to the original clean and raw zeolite. An increase of 11% in pore volume and 46% rise in pore size was also observed. The zeolite washed with alcohol, with 0% lanthanum nitrate hexahydrate, and calcined at 800° C. for 2 h showed a 31% decrease in surface area, 23% increase in pore volume, and 42% rise in average pore size. It also had a higher micropore volume and area than the zeolite coated with 25% lanthanum precursor, thus revealing surface modification of the zeolite surface after coating with lanthanum nitrate hexahydrate. After modification with lanthanum nitrate hexahydrate, the total surface area and the micropore area decreased, but the average pore width increased.

Example 8. Thermogravimetric Analysis of Enhanced Zeolites

The TGA profile (FIG. 8) of prepared 25% La-Zeolite and natural clean zeolite were studied in the temperature range between room temperature and 800° C. The continuous and uninterrupted TG curves of both the zeolites indicate that the frameworks were not destroyed by heating up to 800° C. The total amount of water loss up to 800° C. was determined as 11% for clean zeolite and 1.6% for 25% La-Zeolite, indicating that the lanthanum nitrate hexahydrate treatment and successive heat treatment had a significant effect on the water adsorption capacity of the zeolite.

Example 9. Morphological Properties of Raw-Clean Zeolite and La-Zeolite

Figure 10:
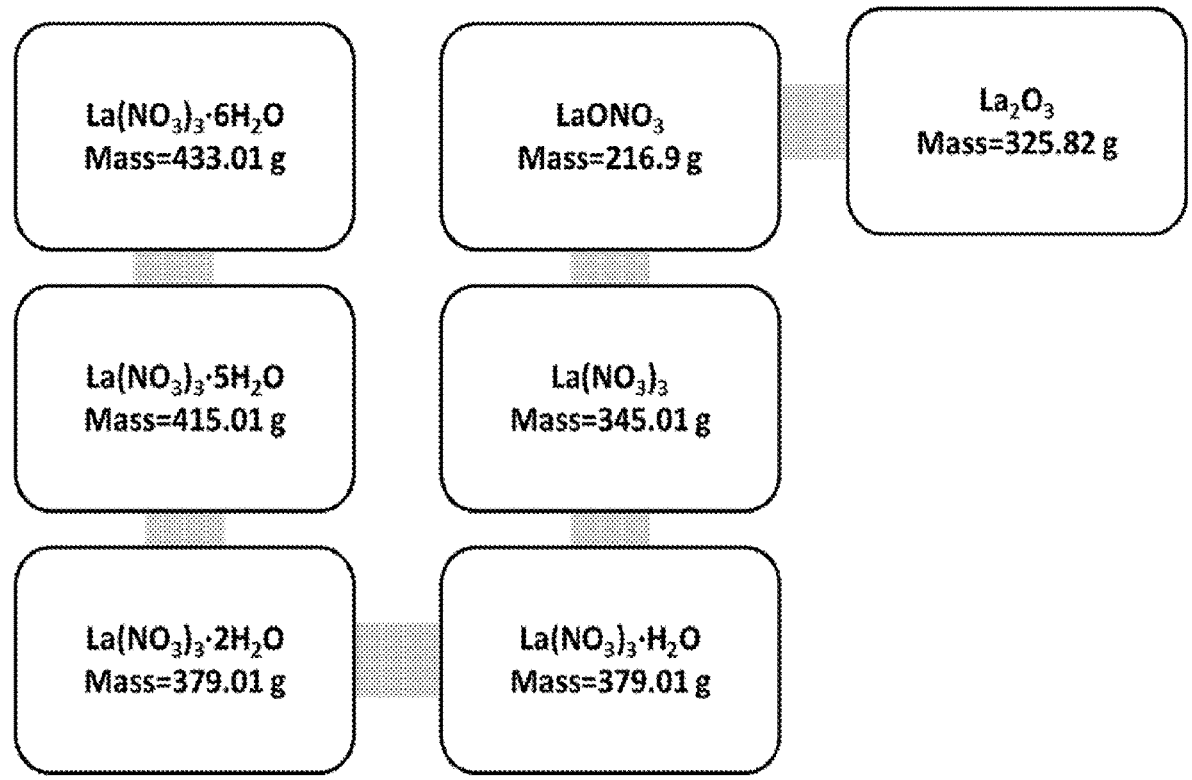
FIG. 10 shows an expected lanthanum mass uptake and loss scheme for an applied lanthanum coating procedure.

FIG. 10 demonstrates the expected lanthanum uptake and loss. In summary, 433.01 g of La $(NO_3)_3 \cdot 6H_2O$ gave 325.82 g of $La_2O_3$. Thus the mass lost in conversion of lanthanum nitrate to lanthanum oxide was 107.19 g, which was 25% of initial mass. In studies conducted on preparation of 0% La-Zeolite, 12.5% La-Zeolite, 25% La-Zeolite, 50% La-Zeolite, and 100% La-Zeolite, a loss of 15-40% was revealed. In the calcination process, $La(NO_3)_3 \cdot 6H_2O$ changed to $La_2O_3$ at 773 K to 873 K, accompanied by volume shrinkage of La species in the pore channels, and accordingly, the increase of surface area. Calcination at temperature higher than 773 K to 873 K may cause slight mesostructure collapse and decrease in surface area. Results are shown in Tables 4 and 5.

TABLE 4

Morphological properties of raw-clean zeolite and La-zeolite made with various amounts of lanthanum nitrate hexahydrate.

| Enhanced Zeolite Sample | Calcination Temperature (° C.) | Calcination Duration (hour) | BET Surface Area ($m^2/g$) | Pore Volume ($cm^3/g$) | Pore Size (Å) | Micro-pore Volume ($cm^3/g$) | Micro-pore Area ($m^2/g$) | External Surface Area ($m^2/g$) |
|---|---|---|---|---|---|---|---|---|
| Raw Clean Zeolite | — | — | 10.795 | 0.02151 | 79.7 | 0.0013 | 2.643 | 8.151 |
| La-zeolite (0% La) w/ alcohol | 800 | 2 | 7.365 | 0.02783 | 148.1 | 0.00070 | 1.460 | 6.055 |
| La-zeolite (25% La) w/ alcohol | 800 | 2 | 6.560 | 0.02431 | 147.8 | 0.00015 | 0.400 | 6.160 |

TABLE 5

BET comparison of La-zeolite.

| Calcination Sample and Date of BET Study | Calcination Temperature (C.) | Calcination Duration (hour) | Single Point Surface Area at P/Po = 0.30035305 ($m^2/g$) | Pore Size (Å) | Pore Specific Volume at P/Po = 0.60065305 ($cm^3/g$) |
|---|---|---|---|---|---|
| La-zeolite (0% La) w/ alcohol | 550 | 6 | 7.973 | 138.1 | 0.02881 |
| La-zeolite (0% La) w/ DI water | 550 | 6 | 8.323 | 128.5 | 0.02717 |
| La-zeolite (12.5% La) Dec. 13, 2014* | 550 | 6 | 6.895 | 126.3 | 0.02221 |
| La-zeolite (25% La) Dec. 12, 2014* | 550 | 6 | 7.125 | 114.4 | 0.02109 |
| La-zeolite (25% La) Jan. 1, 2015* | 800 | 1 | 5.810 | 160.2 | 0.02353 |
| La-zeolite (25% La) Jan. 1, 2015* | 450 | 6 | 6.118 | 122.4 | 0.01916 |
| La-zeolite (25% La) Jan. 9, 2015 | 800 | 2 | 6.393 | 147.9 | 0.02425 |
| La-zeolite (25% La) Jan. 9, 2015 | 650 | 2 | 4.637 | 185.7 | 0.02178 |
| La-zeolite (0% La) | 800 | 2 | 7.365 | 148.1 | 0.02783 |

Example 10. Cleaning of Zeolites

Australian natural zeolite (0.7-1 mm) was provided by Zeolite Australia Ltd. Zeolite particles were exposed to a variety of cleaning and leaching techniques, some included different cycles of sonication and microwaving steps and some included acid-treatment steps. Properties of these materials were evaluated and compared to the raw material (no cleaning step). Acid treatment was performed by refluxing particles in 8% sulfuric acid at 90° C. for 12 hr. The surface area, pore size and pore volume were determined by $N_2$ adsorption isotherm (Quantachrome Autosorb IQ2).

The morphology and composition of the zeolite particles were characterized using a Hitachi S-4800 Scanning Electron Microscope (SEM). Fourier Transform Infrared (FTIR) spectroscopy was performed using a Shimadzu IRTracer-100 FTIR. Further structural features of the material regarding crystallinity were determined using a X-ray powder diffraction (XRD) on a Bruker AXS XRD.

Cleaning and leaching techniques have been shown to be powerful tools for controlling the framework structure (monitored by surface area measurements and SEM images) and tailoring pore architecture (monitored by pore diameter and volume and SEM images) of natural zeolites. Depending on the final application, porosity can be tuned by selecting number of cycles of cleaning steps, as shown in Table 6.

TABLE 6

BET analysis of natural zeolite exposed to multiple cleaning techniques

| | 3x sonicated (Pre-Microwave) | 10 X Sonicated (Pre-Microwave) | Post Microwave | Clean | Acid Treated |
|---|---|---|---|---|---|
| DFT Surface Area ($m^2/g$) | 12.10 | 10.39 | 6.90 | 15.14 | 108.50 |
| DFT Pore Volume ($cm^3/g$) | 0.006 | 0.006 | 0.004 | 0.038 | 0.032 |
| DFT Pore Radius (Å) | 6.23 | 7.16 | 6.52 | 10.24 | 5.31 |

As zeolite particles go through cleaning and leaching steps, modifications in their silica cage can be evaluated by FTIR and XRD. FTIR is able to indicate stages of dealumination related to the exposure of number of cycles of cleaning and leaching steps.

Thus, the disclosure provides, among other things, an enhanced zeolite including zeolite and lanthanum oxide. Various features and advantages of the disclosure are set forth in the following claims.

What is claimed is:

1. An enhanced zeolite comprising zeolite and metal oxide, wherein the metal oxide is lanthanum oxide, magnesium oxide, or mixed metal oxides including one or more lanthanides, the metal oxide being in the form of a nanomaterial;

wherein the enhanced zeolite is stable below about pH 4;

wherein the enhanced zeolite is stable above about pH 10; and wherein the enhanced zeolite is stable at about 450° C.

2. The enhanced zeolite of claim 1, wherein the enhanced zeolite retains at least about 95% of an initial efficiency after being regenerated 3 times.

3. The enhanced zeolite of claim 2, wherein the enhanced zeolite retains at least about 95% of an initial efficiency after being regenerated 4 times.

4. A method of removing phosphorous from water or wastewater comprising contacting the water or wastewater with the enhanced zeolite of claim 1.

5. A method of removing phosphorous from water or wastewater comprising passing the water or wastewater through a column filter comprising the enhanced zeolite of claim 1.

6. A method of removing phosphorous from water or wastewater comprising absorbing phosphorous from the water or wastewater with a permeable or semi-permeable fabric comprising the enhanced zeolite of claim 1.

7. A method of regenerating the enhanced zeolite of claim 1, comprising:
 (a) removing phosphorous from lanthanum phosphate in a solution comprising the enhanced zeolite;
 (b) oxidizing lanthanum in the solution comprising the enhanced zeolite;
 (c) precipitating phosphorous from the solution; and
 (d) separating the precipitated phosphorous in step (c) from the solution.

* * * * *